(12) United States Patent
Luo et al.

(10) Patent No.: US 12,557,277 B2
(45) Date of Patent: Feb. 17, 2026

(54) INTEGRATED CIRCUITRY, MEMORY CIRCUITRY COMPRISING STRINGS OF MEMORY CELLS, AND METHOD OF FORMING INTEGRATED CIRCUITRY

(71) Applicant: Micron Technology, Inc., Boise, ID (US)

(72) Inventors: Shuangqiang Luo, Boise, ID (US); Christopher Larsen, Boise, ID (US); Rui Zhang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 865 days.

(21) Appl. No.: 17/575,939

(22) Filed: Jan. 14, 2022

(65) Prior Publication Data
US 2023/0209824 A1    Jun. 29, 2023

Related U.S. Application Data

(60) Provisional application No. 63/294,019, filed on Dec. 27, 2021.

(51) Int. Cl.
*H10B 43/27* (2023.01)
*G11C 16/04* (2006.01)
(Continued)

(52) U.S. Cl.
CPC ......... *H10B 43/27* (2023.02); *G11C 16/0483* (2013.01); *H01L 23/481* (2013.01);
(Continued)

(58) Field of Classification Search
CPC ........ H10B 43/27; H10B 41/27; H10B 41/10; H10B 43/10; H10B 41/40; H10B 41/50; H10B 43/40; H10B 43/50
See application file for complete search history.

(56) References Cited

U.S. PATENT DOCUMENTS

2013/0161821 A1\* 6/2013 Hwang ................. H10B 43/27
257/E21.585
2017/0148810 A1\* 5/2017 Kai ....................... H10B 43/35
(Continued)

*Primary Examiner* — Jacob Y Choi
*Assistant Examiner* — Aaron Michael Wegner
(74) *Attorney, Agent, or Firm* — Wells St. John P.S.

(57) ABSTRACT

Memory circuitry comprising strings of memory cells comprises laterally-spaced memory blocks individually comprising a vertical stack comprising alternating insulative tiers and conductive tiers. Channel-material strings of memory cells extend through the insulative tiers and the conductive tiers in a memory-array region. The insulative tiers and the conductive tiers of the laterally-spaced memory blocks extend from the memory-array region into a stair-step region. Individual stairs in the stair-step region comprise one of the conductive tiers. Conductive vias are individually directly against conducting material that is in the one conductive tier in one of the individual stairs. Insulator material in the stair-step region is directly above the stairs. An insulative-material lining is circumferentially around and extends elevationally along individual of the conductive vias between the individual conductive vias and the insulator material. Individual of the insulative-material linings and the insulator material comprise an interface there-between. Other embodiments, including methods, are disclosed.

12 Claims, 16 Drawing Sheets

(51) Int. Cl.
  *H01L 23/48* (2006.01)
  *H10B 41/10* (2023.01)
  *H10B 41/27* (2023.01)
  *H10B 41/35* (2023.01)
  *H10B 43/10* (2023.01)
  *H10B 43/35* (2023.01)

(52) U.S. Cl.
  CPC ............. *H10B 41/10* (2023.02); *H10B 41/27* (2023.02); *H10B 41/35* (2023.02); *H10B 43/10* (2023.02); *H10B 43/35* (2023.02)

(56) References Cited

U.S. PATENT DOCUMENTS

2020/0373316 A1* 11/2020 Luo .................. H10B 43/40
2021/0265371 A1*  8/2021 Luo .................. H10B 43/10
2022/0238666 A1*  7/2022 Kim ................ H01L 21/76816

* cited by examiner

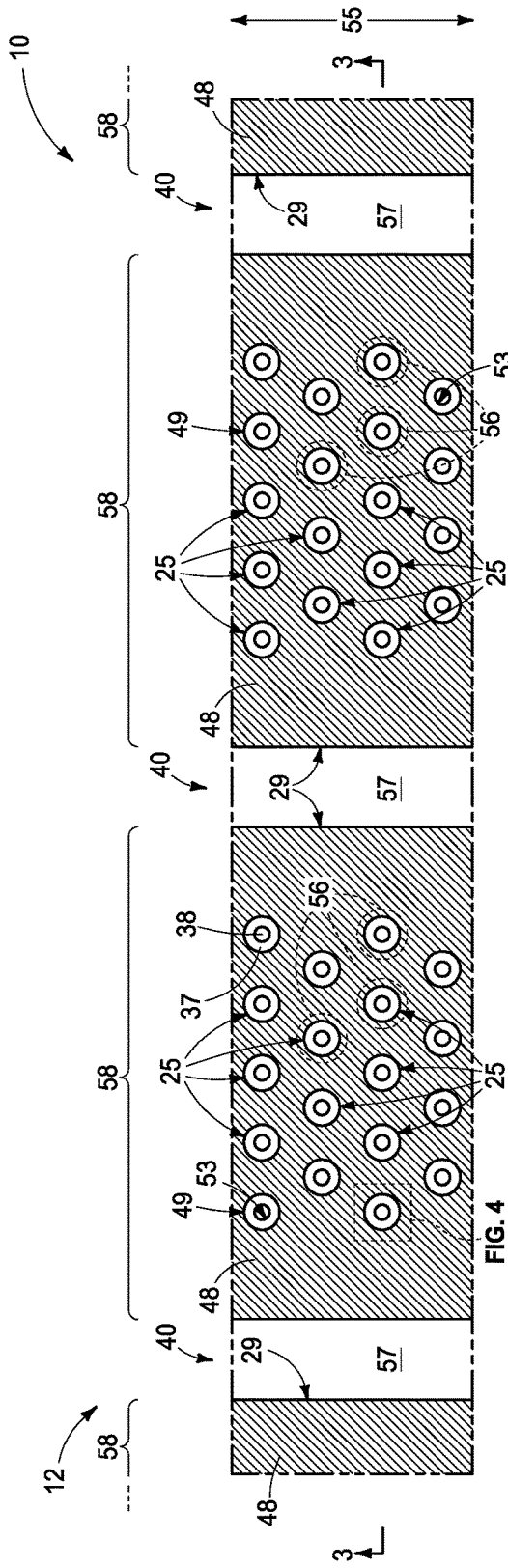
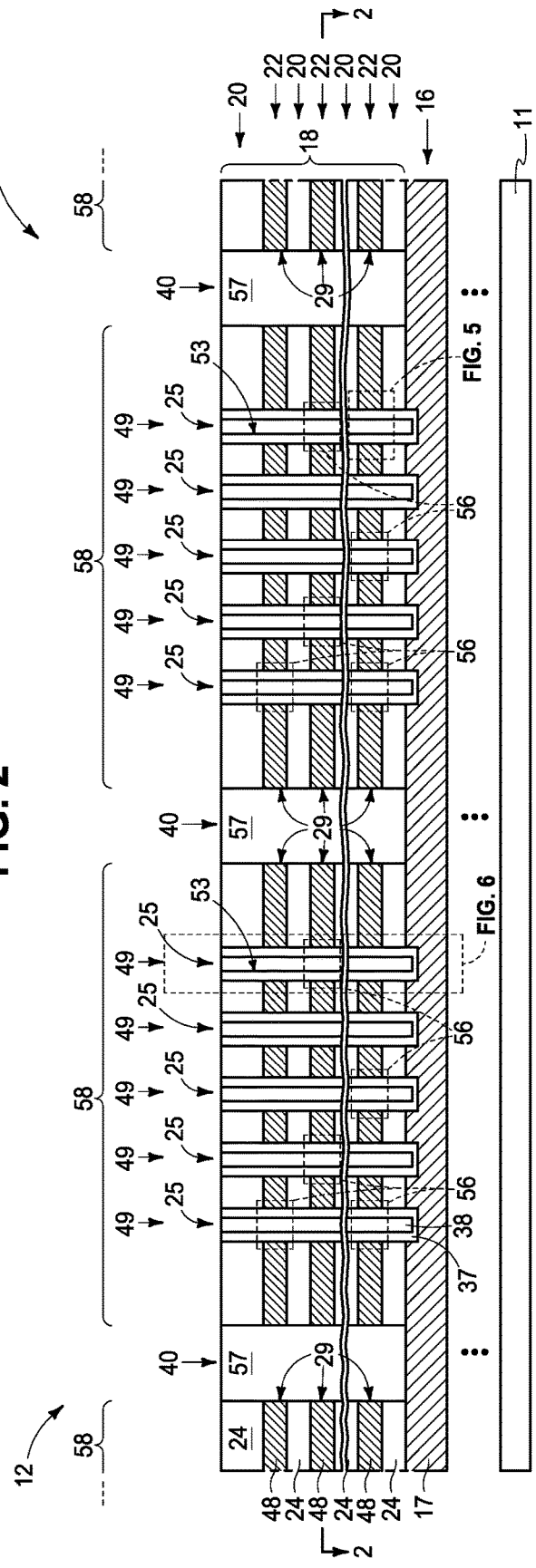
FIG. 2
FIG. 4
FIG. 3

US 12,557,277 B2

INTEGRATED CIRCUITRY, MEMORY CIRCUITRY COMPRISING STRINGS OF MEMORY CELLS, AND METHOD OF FORMING INTEGRATED CIRCUITRY

RELATED PATENT DATA

This application claims priority to U.S. Provisional Patent Application Ser. No. 63/294,019, filed Dec. 27, 2021, entitled "Integrated Circuitry, Memory Circuitry Comprising Strings Of Memory Cells, And Method Of Forming Integrated Circuitry", naming Shuangqiang Luo, Christopher Larsen, and Rui Zhang as inventors, the disclosure of which is incorporated by reference.

TECHNICAL FIELD

Embodiments disclosed herein pertain to integrated circuitry, to memory circuitry comprising strings of memory cells, and to methods of forming integrated circuitry.

BACKGROUND

Memory is one type of integrated circuitry and is used in computer systems for storing data. Memory may be fabricated in one or more arrays of individual memory cells. Memory cells may be written to, or read from, using digitlines (which may also be referred to as bitlines, data lines, or sense lines) and access lines (which may also be referred to as wordlines). The sense lines may conductively interconnect memory cells along columns of the array, and the access lines may conductively interconnect memory cells along rows of the array. Each memory cell may be uniquely addressed through the combination of a sense line and an access line.

Memory cells may be volatile, semi-volatile, or non-volatile. Non-volatile memory cells can store data for extended periods of time in the absence of power. Non-volatile memory is conventionally specified to be memory having a retention time of at least about 10 years. Volatile memory dissipates and is therefore refreshed/rewritten to maintain data storage. Volatile memory may have a retention time of milliseconds or less. Regardless, memory cells are configured to retain or store memory in at least two different selectable states. In a binary system, the states are considered as either a "0" or a "1". In other systems, at least some individual memory cells may be configured to store more than two levels or states of information.

A field effect transistor is one type of electronic component that may be used in a memory cell. These transistors comprise a pair of conductive source/drain regions having a semiconductive channel region there-between. A conductive gate is adjacent the channel region and separated there-from by a thin gate insulator. Application of a suitable voltage to the gate allows current to flow from one of the source/drain regions to the other through the channel region. When the voltage is removed from the gate, current is largely prevented from flowing through the channel region. Field effect transistors may also include additional structure, for example a reversibly programmable charge-storage region as part of the gate construction between the gate insulator and the conductive gate.

Flash memory is one type of memory and has numerous uses in modern computers and devices. For instance, modern personal computers may have BIOS stored on a flash memory chip. As another example, it is becoming increasingly common for computers and other devices to utilize flash memory in solid state drives to replace conventional hard drives. As yet another example, flash memory is popular in wireless electronic devices because it enables manufacturers to support new communication protocols as they become standardized, and to provide the ability to remotely upgrade the devices for enhanced features.

NAND may be a basic architecture of integrated flash memory. A NAND cell unit comprises at least one selecting device coupled in series to a serial combination of memory cells (with the serial combination commonly being referred to as a NAND string). NAND architecture may be configured in a three-dimensional arrangement comprising vertically-stacked memory cells individually comprising a reversibly programmable vertical transistor. Control or other circuitry may be formed below the vertically-stacked memory cells. Other volatile or non-volatile memory array architectures may also comprise vertically-stacked memory cells that individually comprise a transistor.

Memory arrays may be arranged in memory pages, memory blocks and partial blocks (e.g., sub-blocks), and memory planes, for example as shown and described in any of U.S. Patent Application Publication Nos. 2015/0228651, 2016/0267984, and 2017/0140833. The memory blocks may at least in part define longitudinal outlines of individual wordlines in individual wordline tiers of vertically-stacked memory cells. Connections to these wordlines may occur in a so-called "stair-step structure" at an end or edge of an array of the vertically-stacked memory cells. The stair-step structure includes individual "stairs" (alternately termed "steps" or "stair-steps") that define contact regions of the individual wordlines upon which elevationally-extending conductive vias contact to provide electrical access to the wordlines.

BRIEF DESCRIPTION OF THE DRAWINGS

FIGS. 2-12 and 19 are diagrammatic sectional, expanded, enlarged, and/or partial views of the construction of FIG. 1 or portions thereof, and/or of alternate embodiments thereof.

DETAILED DESCRIPTION OF EXAMPLE EMBODIMENTS

Figure 1:
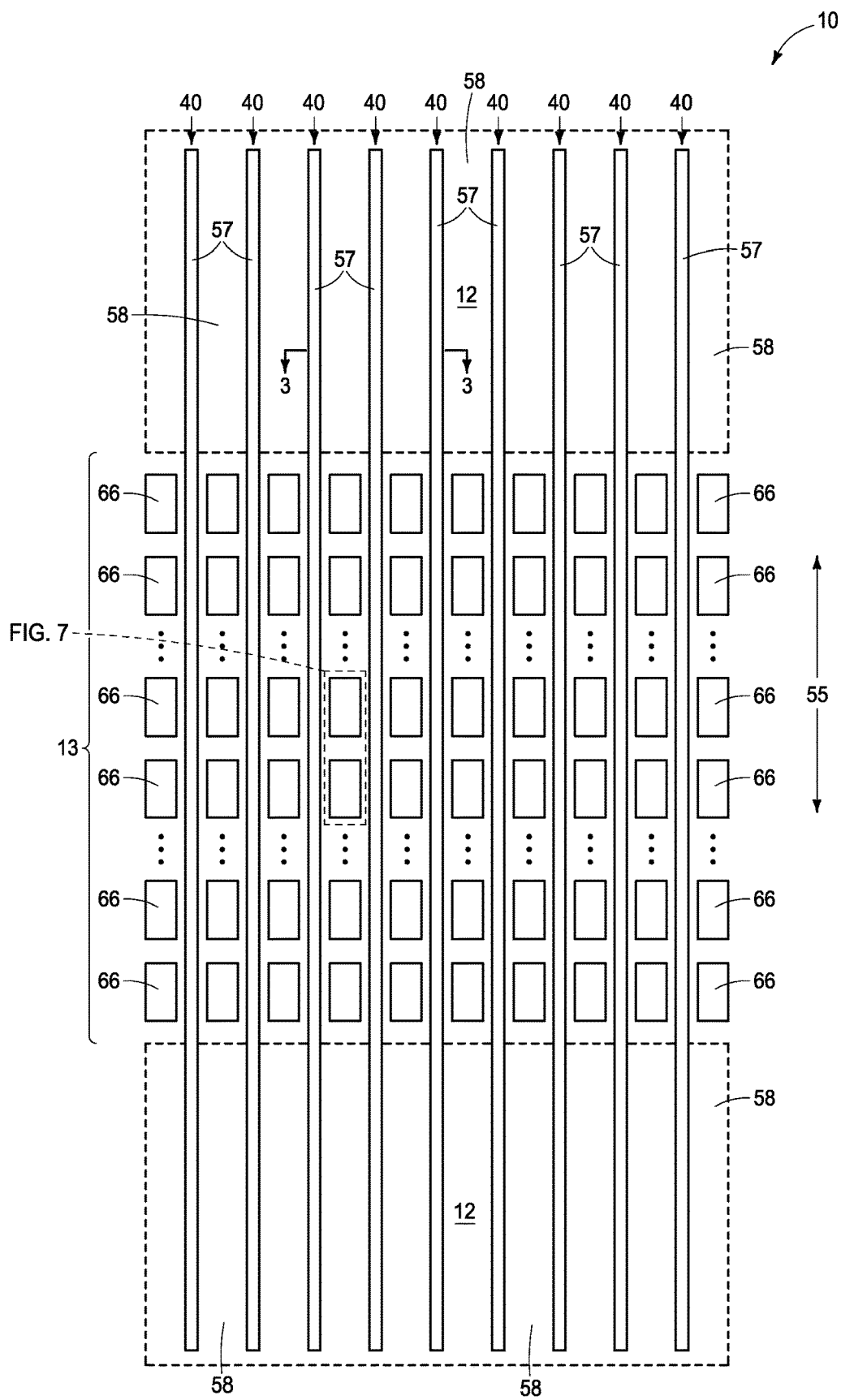
FIG. 1 is a diagrammatic view of a portion of memory circuitry comprising strings of memory cells in accordance with an embodiment of the invention.

FIGS. 1-12 show a construction 10 comprising memory circuitry having two memory-array regions 12 comprising elevationally-extending strings 49 of transistors and/or memory cells 56 (e.g., comprising NAND). A stair-step region 13 is between memory-array regions 12. Construction 10 may comprise only a single memory-array region 12 or may comprise more than two memory-array regions 12 (neither being shown). FIGS. 7-12 are of different and varying scales compared to FIGS. 1-6 for clarity in disclosure more pertinent to components in stair-step region 13 than in memory-array regions 12. Construction 10 comprises a base substrate 11 having any one or more of conductive/conductor/conducting, semiconductive/semiconductor/semiconducting, or insulative/insulator/insulating (i.e., electrically herein) materials. Various materials have been formed elevationally over base substrate 11. Materials may be aside, elevationally inward, or elevationally outward of the FIGS. 1-12-depicted materials. For example, other partially or wholly fabricated components of integrated circuitry may be provided somewhere above, about, or within base substrate 11. Control and/or other peripheral circuitry for operating components within an array (e.g., individual array regions 12) of elevationally-extending strings of memory cells may also be fabricated and may or may not be wholly or partially within an array or sub-array. Further, multiple sub-arrays may also be fabricated and operated independently, in tandem, or otherwise relative one another. In this document, a "sub-array" may also be considered as an array.

A conductor tier 16 comprising conductor material 17 is above substrate 11. Conductor tier 16 may comprise part of control circuitry (e.g., peripheral-under-array circuitry and/or a common source line or plate) used to control read and write access to the transistors and/or memory cells in array 12. A vertical stack 18 comprising vertically-alternating insulative tiers 20 and conductive tiers 22 is above conductor tier 16. In some embodiments, conductive tiers 22 may be referred to as first tiers 22 and insulative tiers 20 are referred to as second tiers 20. Insulative tiers 20 and conductive tiers 22 extend from memory-array region 12 into stair-step region 13. Example thickness for each of tiers 20 and 22 is 20 to 60 nanometers. The example uppermost tier 20 may be thicker/thickest compared to one or more other tiers 20 and/or 22. Only a small number of tiers 20 and 22 is shown in FIGS. 2-12 (more shown in FIGS. 7 and 8 as compared to FIGS. 1-6 due to scale and for clarity in stair-step region 13), with more likely stack 18 comprising dozens, a hundred or more, etc. of tiers 20 and 22. Other circuitry that may or may not be part of peripheral and/or control circuitry may be between conductor tier 16 and stack 18. For example, multiple vertically-alternating tiers of conductive material and insulative material of such circuitry may be below a lowest of the conductive tiers 22 and/or above an uppermost of the conductive tiers 22. For example, one or more select gate tiers (not shown) may be between conductor tier 16 and the lowest conductive tier 22 and one or more select gate tiers may be above an uppermost of conductive tiers 22. (not shown). Alternately or additionally, at least one of the depicted uppermost and lowest conductive tiers 22 may be a select gate tier. Example insulative tiers 20 comprise insulative material 24 (e.g., silicon dioxide and/or other material that may be of one or more composition(s)).

Channel openings 25 have been formed (e.g., by etching) through insulative tiers 20 and conductive tiers 22 to conductor tier 16. Channel openings 25 may taper radially-inward (not shown) moving deeper in stack 18. In some embodiments, channel openings 25 may go into conductor material 17 of conductor tier 16 as shown or may stop there-atop (not shown). Alternately, as an example, channel openings 25 may stop atop or within the lowest insulative tier 20. A reason for extending channel openings 25 at least to conductor material 17 of conductor tier 16 is to assure direct electrical coupling of channel material to conductor tier 16 without using alternative processing and structure to do so when such a connection is desired. Etch-stop material (not shown) may be within or atop conductor material 17 of conductor tier 16 to facilitate stopping of the etching of channel openings 25 relative to conductor tier 16 when such is desired. Such etch-stop material may be sacrificial or non-sacrificial. By way of example and for brevity only, channel openings 25 are shown as being arranged in groups or columns of staggered rows of four and five openings 25 per row and being arrayed in laterally-spaced memory blocks 58. In this document, "block" is generic to include "sub-block". Memory blocks 58 may be considered as being longitudinally elongated and oriented, for example along a first direction 55, Any alternate existing or future-developed arrangement and construction may be used.

The two memory-array regions 12 may be of the same or different constructions relative one another. Regardless, channel-material strings (e.g., 53) of memory cells (e.g., 56) extend through the insulative tiers (e.g., 20) and the conductive tiers (e.g., 22) in memory blocks (e.g., 58) in each of two memory-array regions 12.

Example memory blocks 58 are shown as at least in part having been defined by horizontally-elongated trenches 40 that were formed (e.g., by anisotropic etching) into stack 18. Trenches 40 will typically be wider than lower channel openings 25 (e.g., 3 to 10 times wider). Trenches 40 may have respective bottoms that are directly against conductor material 17 (e.g., atop or within) of conductor tier 16 (as shown) or may have respective bottoms that are above conductor material 17 of conductor tier 16 (not shown). Walls 57 are individually in trenches 40 between immediately-adjacent memory blocks 58. Walls 57 may provide lateral electrical isolation (insulation) between immediately-laterally-adjacent memory blocks 58. Walls 57 may include one or more of insulative, semiconductive, and conducting materials and, regardless, may facilitate conductive tiers 22 from shorting relative one another in a finished circuitry construction. Example insulative materials are one or more of $SiO_2$, $Si_3N_4$, $Al_2O_3$, and undoped polysilicon. Walls 57 may include through-array-vias (TAVs, and not shown).

Transistor channel material may be formed in the individual channel openings elevationally along the insulative tiers and the conductive tiers, thus comprising individual channel-material strings, which is directly electrically coupled with conductive material in the conductor tier. Individual memory cells of the example memory array being formed may comprise a gate region (e.g., a control-gate region) and a memory structure laterally between the gate region and the channel material. In one such embodiment, the memory structure is formed to comprise a charge-blocking region, storage material (e.g., charge-storage material), and an insulative charge-passage material. The storage material (e.g., floating gate material such as doped or undoped silicon or charge-trapping material such as silicon nitride, metal dots, etc.) of the individual memory cells is elevationally along individual of the charge-blocking regions. The insulative charge-passage material (e.g., a band gap-engineered structure having nitrogen-containing material [e.g., silicon nitride] sandwiched between two insulator oxides [e.g., silicon dioxide]) is laterally between the channel material and the storage material.

Figure 6:
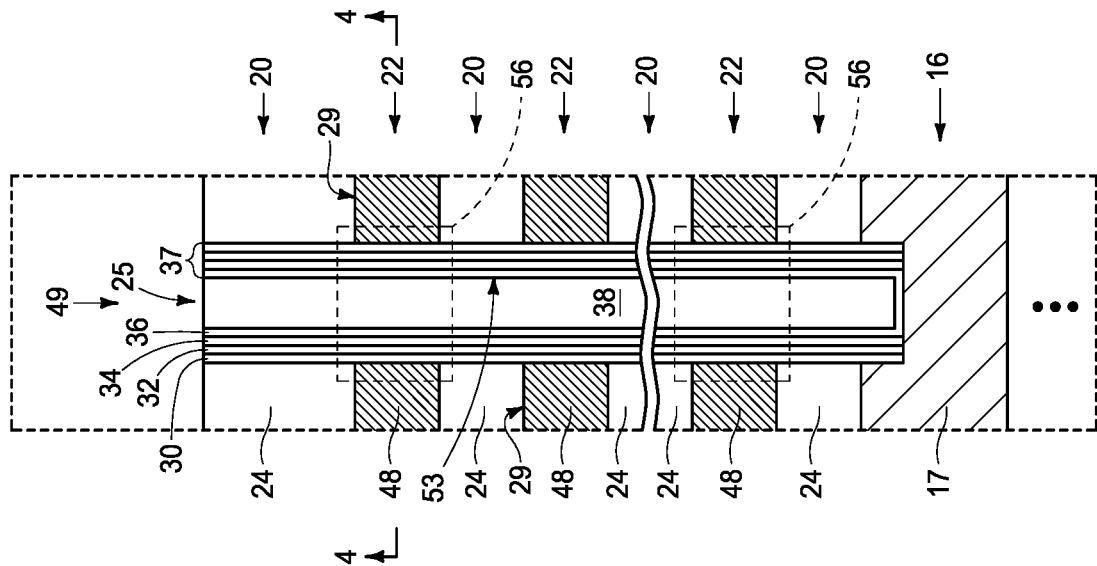
Figure 4:
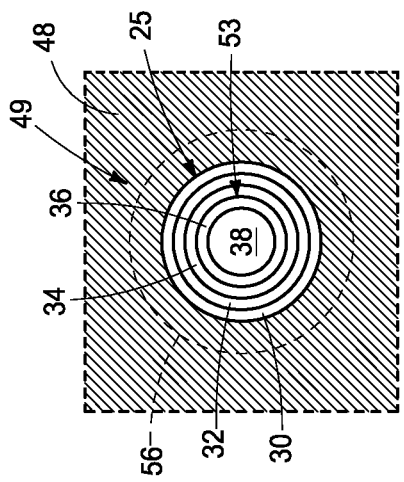
Figure 5:
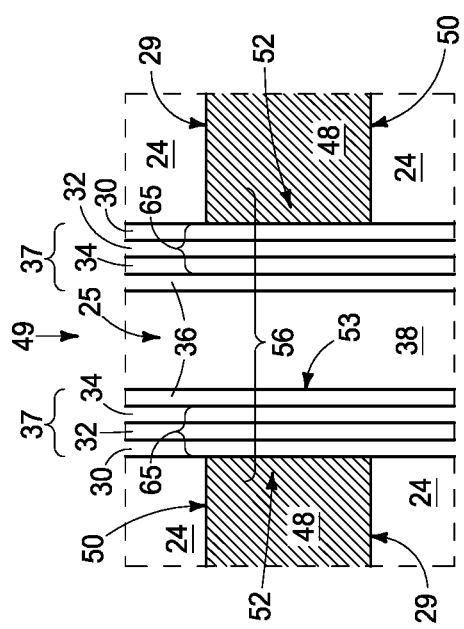

FIGS. 4-6 show one embodiment wherein charge-blocking material 30, storage material 32, and charge-passage material 34 have been formed in individual channel openings 25 elevationally along insulative tiers 20 and conductive tiers 22. Transistor materials 30, 32, and 34 (e.g., memory-cell materials) may be formed by, for example, deposition of respective thin layers thereof over stack 18 and within individual channel openings 25 followed by planarizing such back at least to a top surface of stack 18 as shown.

Channel material 36 has also been formed in channel openings 25 elevationally along insulative tiers 20 and conductive tiers 22 and comprise individual operative channel-material strings 53 in one embodiment having memory-cell materials (e.g., 30, 32, and 34) there-along and with material 24 in insulative tiers 20 being horizontally-between immediately-adjacent channel-material strings 53. Materials 30, 32, 34, and 36 are collectively shown as and only designated as material 37 in some figures due to scale. Example channel materials 36 include appropriately-doped crystalline semiconductor material, such as one or more silicon, germanium, and so-called III/V semiconductor materials (e.g., GaAs, InP, GaP, and GaN). Example thickness for each of materials 30, 32, 34, and 36 is 25 to 100 Angstroms. Punch etching may be conducted as shown to remove materials 30, and 34 from the bases of channel openings 25 to expose conductor tier 16 such that channel material 36 is directly against conductor material 17 of conductor tier 16. Such punch etching may occur separately with respect to each of materials 30, 32, and 34 (as shown) or may occur collectively with respect to all after deposition of material 34 (not shown). Alternately, and by way of example only, no punch etching may be conducted and channel material 36 may be directly electrically coupled to conductor material 17 of conductor tier 16 by a separate conductive interconnect (not shown). Channel openings 25 are shown as comprising a radially-central solid dielectric material 38 (e.g., spin-on-dielectric, silicon dioxide, and/or silicon nitride). Alternately, and by way of example only, the radially-central portion within channel openings 25 may include void space(s) (not shown) and/or be devoid of solid material (not shown).

Example conductive tiers 22 comprise conducting material 48 that is part of individual conductive lines 29 (e.g., wordlines) that may extend across stair-step region 13 along first direction 55 into and within individual memory blocks 58 in each of two memory-array regions 12. Conductive lines 29 comprise part of elevationally-extending strings 49 of individual transistors and/or memory cells 56. A thin insulative liner (e.g., $Al_2O_3$ and not shown) may be formed before forming conducting material 48. Approximate locations of some transistors and/or some memory cells 56 are indicated with a bracket or with dashed outlines, with transistors and/or memory cells 56 being essentially ring-like or annular in the depicted example. Alternately, transistors and/or memory cells 56 may not be completely encircling relative to individual channel openings 25 such that each channel opening 25 may have two or more elevationally-extending strings 49 (e.g., multiple transistors and/or memory cells about individual channel openings in individual conductive tiers with perhaps multiple wordlines per channel opening in individual conductive tiers, and not shown). Conducting material 48 may be considered as having terminal ends 50 corresponding to control-gate regions 52 of individual transistors and/or memory cells 56. Control-gate regions 52 in the depicted embodiment comprise individual portions of individual conductive lines 29. Materials 30, 32, and 34 may be considered as a memory structure 65 that is laterally between control-gate region 52 and channel material 36.

A charge-blocking region (e.g., charge-blocking material 30) is between storage material 32 and individual control-gate regions 52. A charge block may have the following functions in a memory cell: In a program mode, the charge block may prevent charge carriers from passing out of the storage material (e.g., floating-gate material, charge-trapping material, etc.) toward the control gate, and in an erase mode the charge block may prevent charge carriers from flowing into the storage material from the control gate. Accordingly, a charge block may function to block charge migration between the control-gate region and the storage material of individual memory cells. An example charge-blocking region as shown comprises insulator material 30. By way of further examples, a charge-blocking region may comprise a laterally (e.g., radially) outer portion of the storage material (e.g., material 32) where such storage material is insulative (e.g., in the absence of any different-composition material between an insulative storage material 32 and conducting material 48). Regardless, as an additional example, an interface of a storage material and conductive material of a control gate may be sufficient to function as a charge-blocking region in the absence of any separate-composition-insulator material 30. Further, an interface of conducting material 48 with material 30 (when present) in combination with insulator material 30 may together function as a charge-blocking region, and as alternately or additionally may a laterally-outer region of an insulative storage material (e.g., a silicon nitride material 32). An example material 30 is one or more of silicon hafnium oxide and silicon dioxide.

Example stair-step region 13 comprises stair-step structures 66 that are laterally between immediately-adjacent walls 57 and have stairs 70. Example stairs 70 are arranged in two opposing flights 67, 69 and individually comprise a tread 71, a riser 72, one of insulative tiers 20 (i.e., at least one), and one of conductive tiers 22 (i.e., at least one). Individual stairs 70 are shown as having a top region that is one of insulative tiers 20 and a next-lower region that is one of conductive tiers 22, although this may be reversed (not shown). Flights 67 and 69 may have the same or different number of stairs (different being shown). Only a single flight of stairs may be used (not shown) and if multiple flights are used, one of such may be dummy (i.e., a circuit-inoperative structure; e.g., flight 69 as shown). A crest 81 is between immediately-adjacent stair-step structures 66. Vertical stack 18 comprises insulator material 82 in stair-step region 13 that is directly above stairs 70 (e.g., a combination of a silicon nitride liner directly against stairs 70, with silicon dioxide thereover).

Conductive vias 80* extend through insulator material 82 (an * being used as a suffix to be inclusive of all such same-numerically-designated components that may or may not have other suffixes) and are individually directly against conducting material 48 (e.g., of a conductive line 29) that is in one conductive tier 22 in one of individual stairs 70. Example conductive vias 80* comprise conductive material 95 (e.g., conductive metal material). Example conductive vias 80* (e.g., 80f, 80g, 80h, 80k, 80m, 80p) are shown as being circular in horizontal cross-section although any alternate shape may be used. An insulative-material lining 92 comprising insulative material 91 is circumferentially around and extends elevationally along individual conductive vias 80* between such a via and insulator material 82 (shown as a solid dark line in FIG. 7 due to scale). By way of examples only, example insulative materials are silicon dioxide, silicon nitride, hafnium oxide, aluminum oxide, and undoped polysilicon. Individual insulative-material linings 92 and insulator material 82 comprise an interface 96 there-between. In one embodiment and as shown, insulative material 91 is directly against insulator material 82 and/or individual conductive vias 80* have a bottom 73 that is lower than a bottom 74 of insulative-material lining 92 that is circumferentially there-around. In one embodiment, insulative material 91 and insulator material 82 are of different compositions relative one another and in another embodiment such are of the same composition relative one another.

Figure 10:
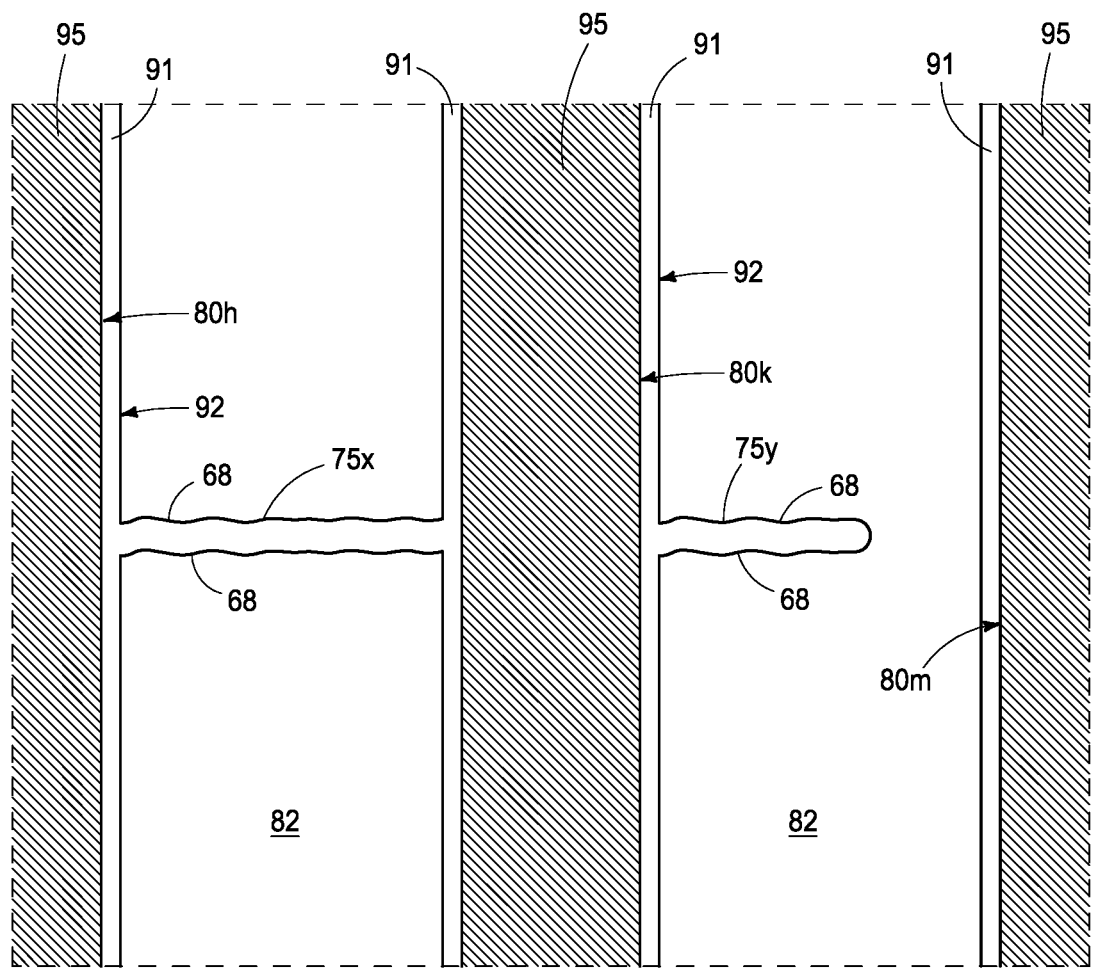
Figure 11:
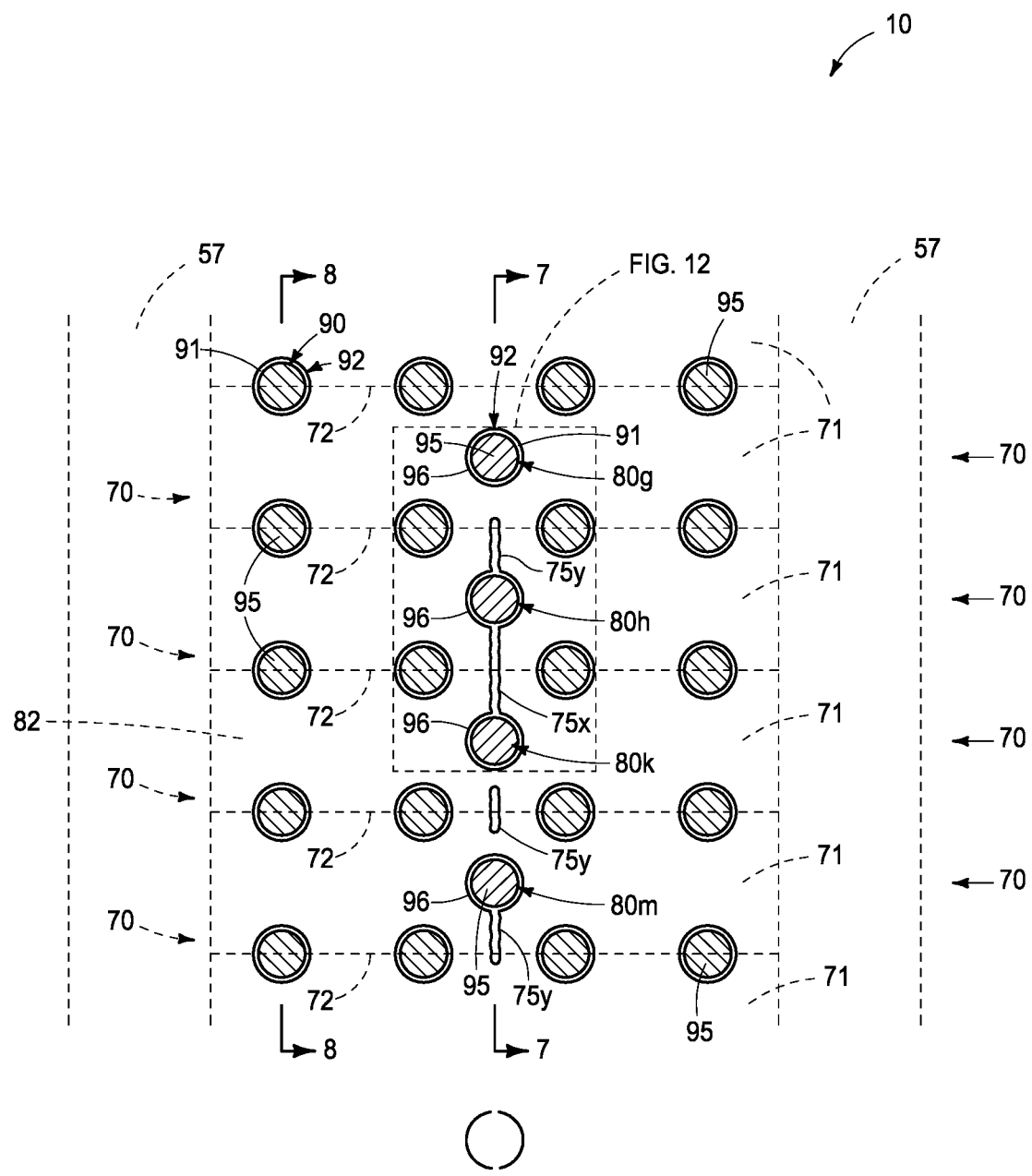
Figure 12:
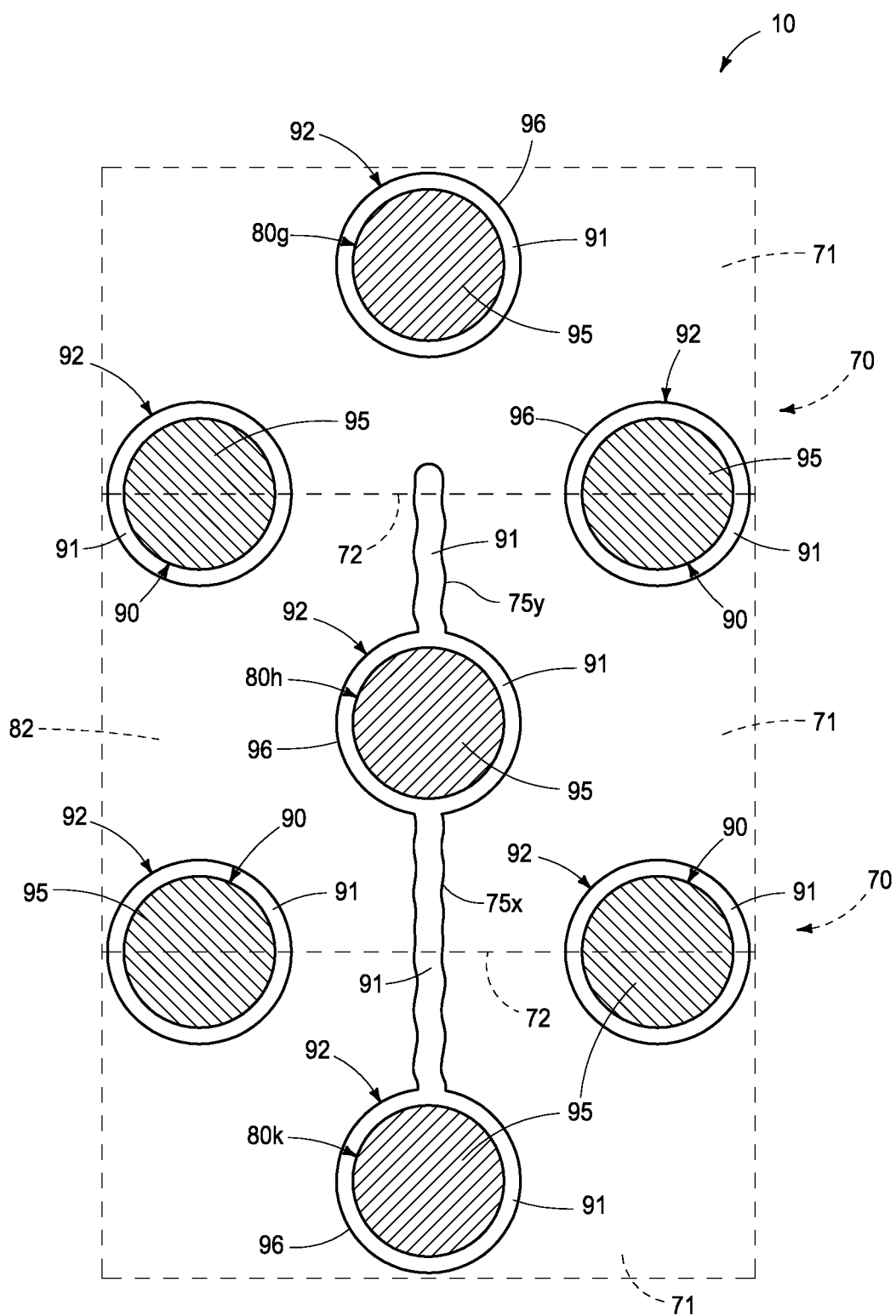

In one embodiment, a seam 75* (at least one) is in insulator material 82, is directly above and extends between treads 71 of two immediately-adjacent stairs 70, and insulative material 91 is in seam 75*. Two opposing interfaces 68 are individually between insulative material 91 that is in seam 75* and insulator material 82 (FIG. 10). In one embodiment and as shown, two opposing interfaces 68 are vertically opposing relative one another. In one embodiment, seam 75\* extends continuously between, to, and from two immediately-adjacent conductive vias 80\* that are individually directly above a respective one of the two immediately-adjacent treads 71 and in one such embodiment insulative material 91 completely fills the continuously-extending seam 75\* where such seam extends continuously between, to, and from its two immediately-adjacent conductive vias 80\*. In another embodiment, seam 75\* does not extend continuously between, to, and from two immediately-adjacent conductive vias 80\* that are individually directly above a respective one of the two immediately-adjacent treads 71. As examples, seams 75x extend so-continuously and seams 75y do not. In one embodiment, seam 75\* extends horizontally-between the treads 71 of the two immediately-adjacent stairs 70.

A seam 75\* may include one or more of elongated vertical, horizontal, diagonal, curved, combination of curved and straight parts, etc., in straight-line vertical and/or horizontal cross-section and a seam 75\* may extend between and/or along multiple tiers 20 and/or 22.

In one embodiment, the memory circuitry comprises TAVs 90 individually extending through individual of individual stairs 70. In one such embodiment and as shown, multiple TAVs 90 extend through individual risers 72 and through treads 71 of immediately-adjacent stairs 70. Example TAVs 90 have an example insulative-material lining 92 radially there-about (shown as a solid dark line in FIG. 8 due to scale). Conductive vias 80\* may be routed horizontally (not shown) above stack 18 and connect (not shown) with individual TAVs 90 that extend through stack 18 to circuitry there-below. Such horizontal routing may be through TAVs extending through walls 57 and/or adjacent stair-step region 13 (neither being shown). Example TAVs 90 are shown extending through conductor tier 16. Alternately, such may stop atop or within conductor tier 16. Regardless, conductor tier 16 may be vertically-segmented in the FIGS. 7 and 8 cross-sections (not shown) as opposed to being horizontally-continuous as shown.

Some of conductive vias 80\* and/or TAVs 90 may be dummy.

Any other attribute(s) or aspect(s) as shown and/or described herein with respect to other embodiments may be used in the embodiments shown and described with reference to the above embodiments and any of the embodiments herein may combine attributes thereof.

Figure 19:
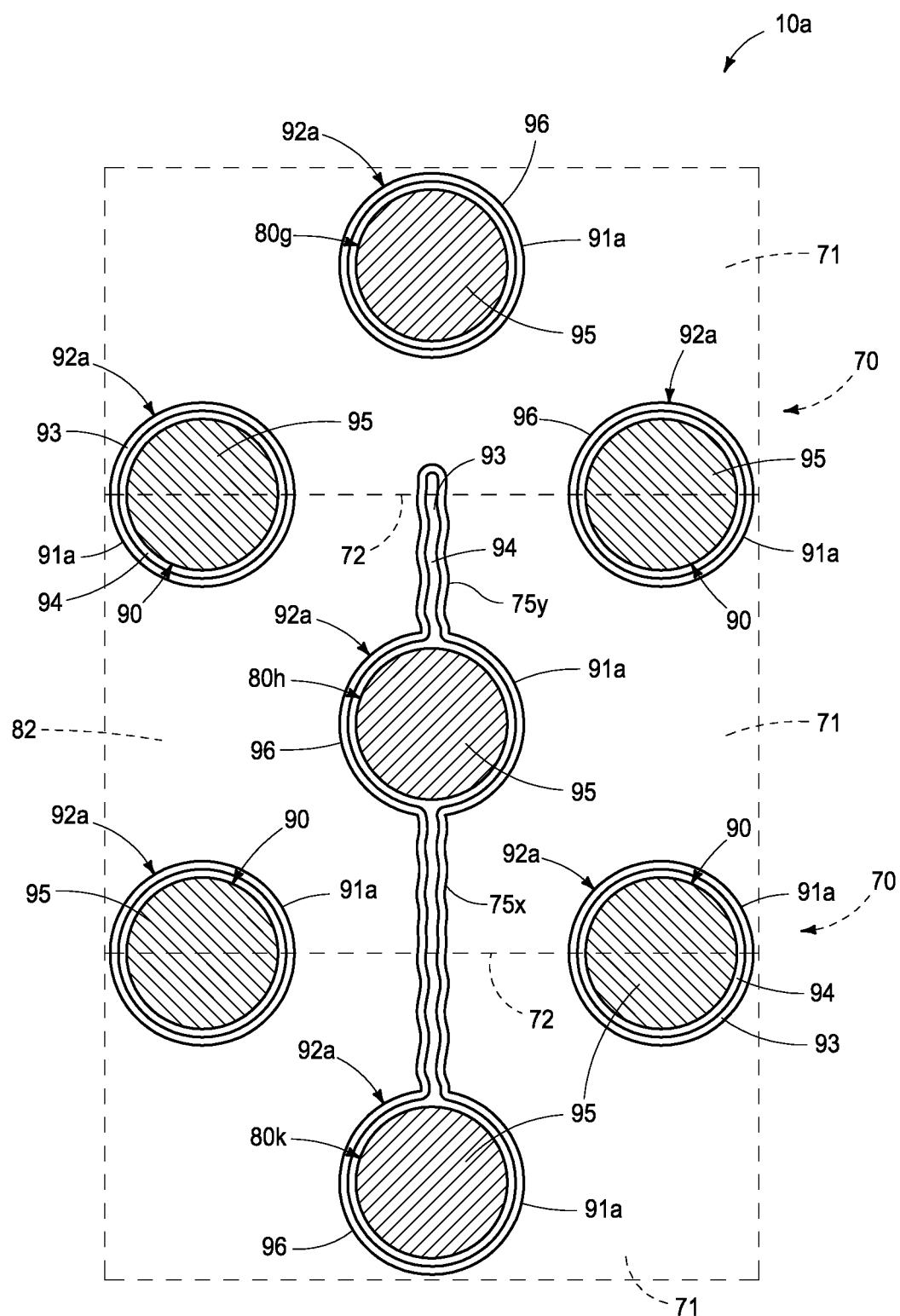

In one embodiment, the insulative material comprises two different composition insulating materials that are directly against one another, for example as shown with respect to a construction 10a in FIG. 19. Like numerals from the above-described embodiments have been used where appropriate, with some construction differences being indicated with the suffix "a" or with different numerals. Example insulative-material lining 92a comprises insulative material 91a comprising two different composition insulating materials 93 and 94 that are directly against one another. By way of examples only, example insulative materials again are silicon dioxide, silicon nitride, hafnium oxide, aluminum oxide, and undoped polysilicon. Insulative material 91a may comprise more than two insulating materials (not shown). In one embodiment, one of the two different composition insulating materials 93 and 94 is of the same composition as that of insulator material 82, and in one such embodiment the one insulating material (e.g., 93) is directly against insulator material 82 and in one embodiment is not directly against insulator material 82 (e.g., 94). In one embodiment, neither of the two different composition insulating materials 93 and 94 is of the same composition as that of insulator material 82. Both of insulating materials 93 and 94 may be in a seam 75\* (as shown), only one may so be (not shown), or none may so be (not shown).

Embodiments of the invention encompass integrated circuitry regardless of whether comprising memory circuitry and if comprising memory circuitry regardless of whether comprising strings of memory cells. Integrated circuitry in accordance with some embodiments of the invention comprises a three-dimensional (3D) array region (e.g., 12) individually comprising tiers (e.g., 22) of electronic components (e.g., 56). The 3D array region comprises a vertical stack (e.g., 18) comprising alternating insulative tiers (e.g., 20) and conductive tiers (e.g., 22). The insulative tiers and the conductive tiers extend from the 3D array region into a stair-step region (e.g., 13). Individual stairs (e.g., 70) in the stair-step region comprise one of the conductive tiers (i.e., at least one). The integrated circuitry comprises conductive vias (e.g., 80\*) that are individually directly against conducting material (e.g., 48) that is in the one conductive tier in one of the individual stairs. Insulator material (e.g., 82) is in the stair-step region directly above the stairs. An insulative-material lining (e.g., 92) is circumferentially around and extends elevationally along individual of the conductive vias between the individual conductive vias and the insulator material. Individual of the insulative-material linings and the insulator material comprise an interface there-between (e.g., 96). Any other attribute(s) car aspect(s) as shown and/or described herein with respect to other embodiments may be used.

integrated circuitry in accordance with some embodiments of the invention comprises a three-dimensional (3D) array region (e.g., 12) individually comprising tiers (e.g., 22) of electronic components (e.g., 56). The 3D array region comprises a vertical stack (e.g., 18) comprising alternating insulative tiers (e.g., 20) and conductive tiers (e.g., 22). The insulative tiers and the conductive tiers extend from the 3D array region into a stair-step region (e.g., 13). Individual stairs (e.g., 70) in the stair-step region comprise one of the conductive tiers (i.e., at least one). The integrated circuitry comprises conductive vias (e.g., 80\*) that are individually directly against conducting material (e.g., 48) that is in the one conductive tier in one of the individual stairs. Insulator material (e.g., 82) is in the stair-step region directly above the stairs. A seam (e.g., 75\*) is in the insulator material and is directly above and extends between treads (e.g., 71) of two immediately-adjacent of the stairs. Insulative material (e.g., 91) is in the seam. Two opposing interfaces (e.g., 68) are individually between the insulative material that is in the seam and the insulator material. Any other attribute(s) or aspect(s) as shown and/or described herein with respect to other embodiments may be used.

Embodiments of the invention encompass methods of forming integrated circuitry. Embodiments of the invention encompass integrated circuitry independent of method of manufacture. Nevertheless, such integrated circuitry may have any of the attributes as described herein in method embodiments. Likewise, the described method embodiments may incorporate, form, and/or have any of the attributes described with respect to structure embodiments.

Example method embodiments of forming integrated circuity are next described primarily with reference to FIGS. 7, 9-12, and 13-18.

Figure 7:
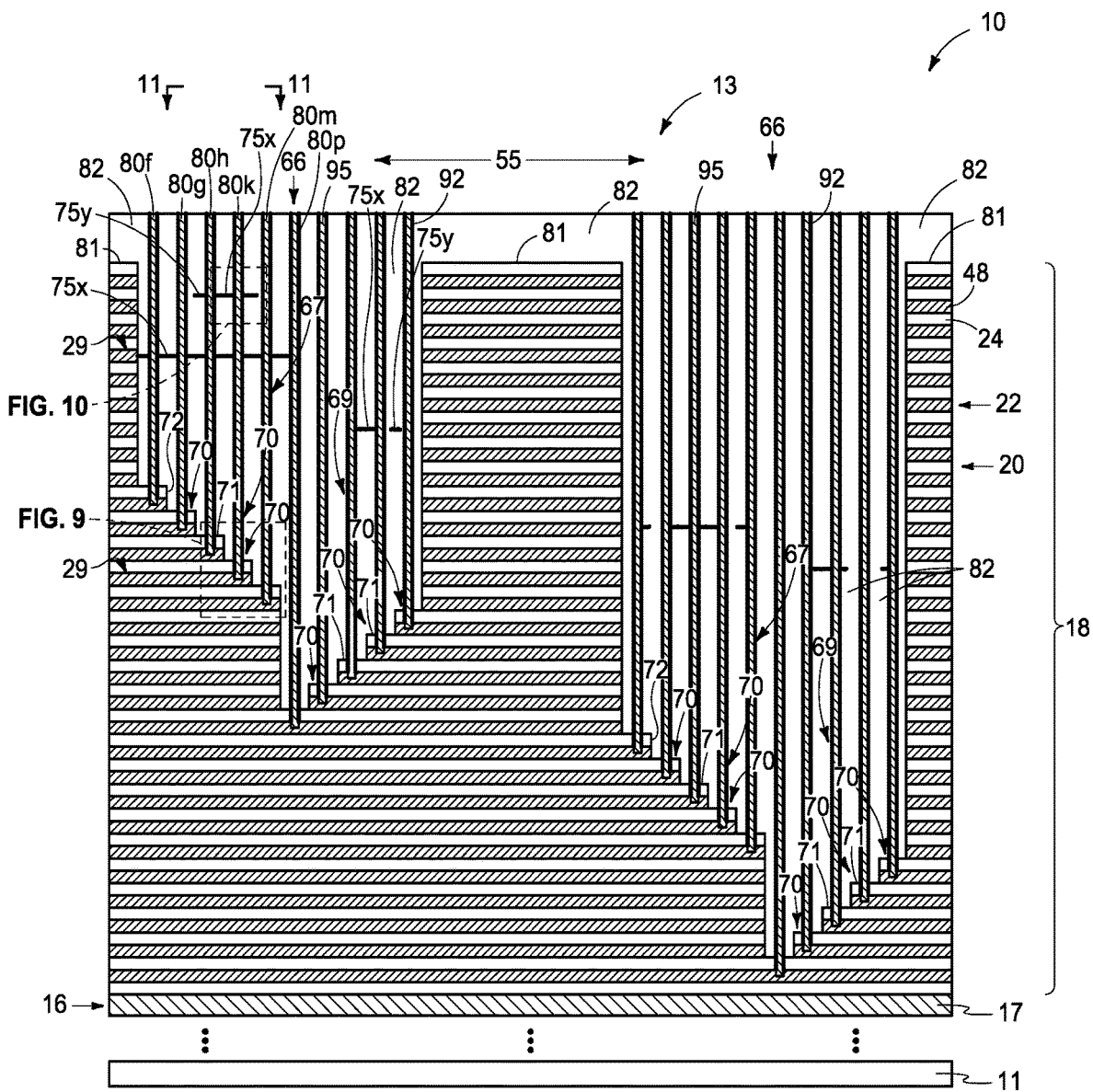
Figure 8:
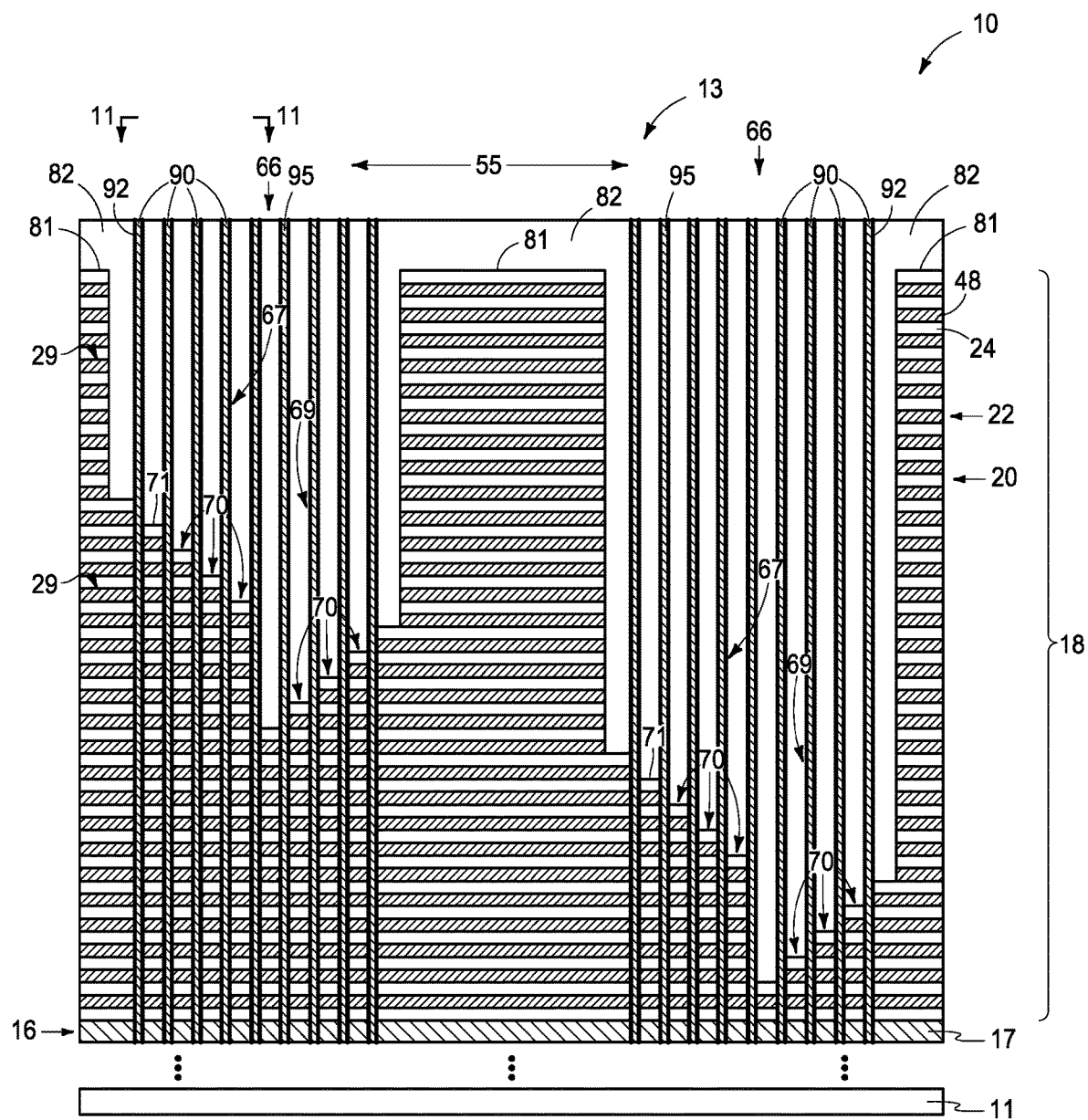
Figure 9:
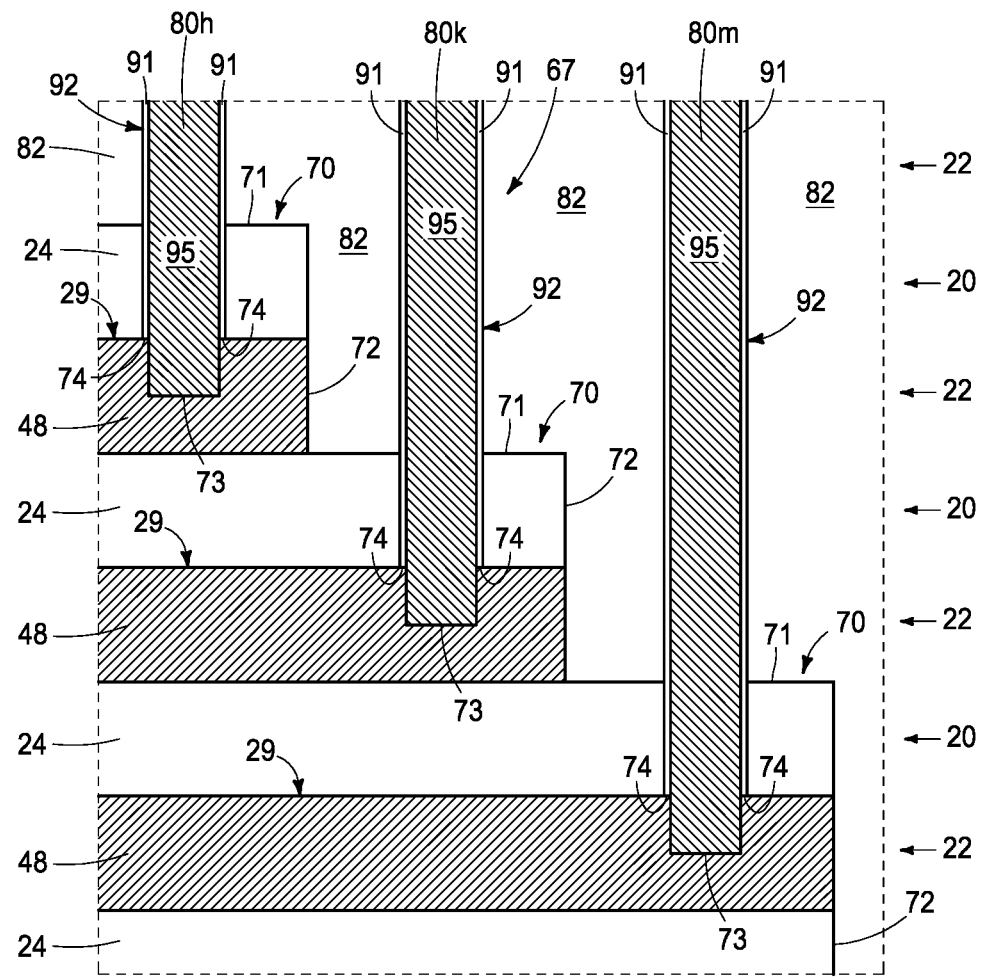
Figure 13:
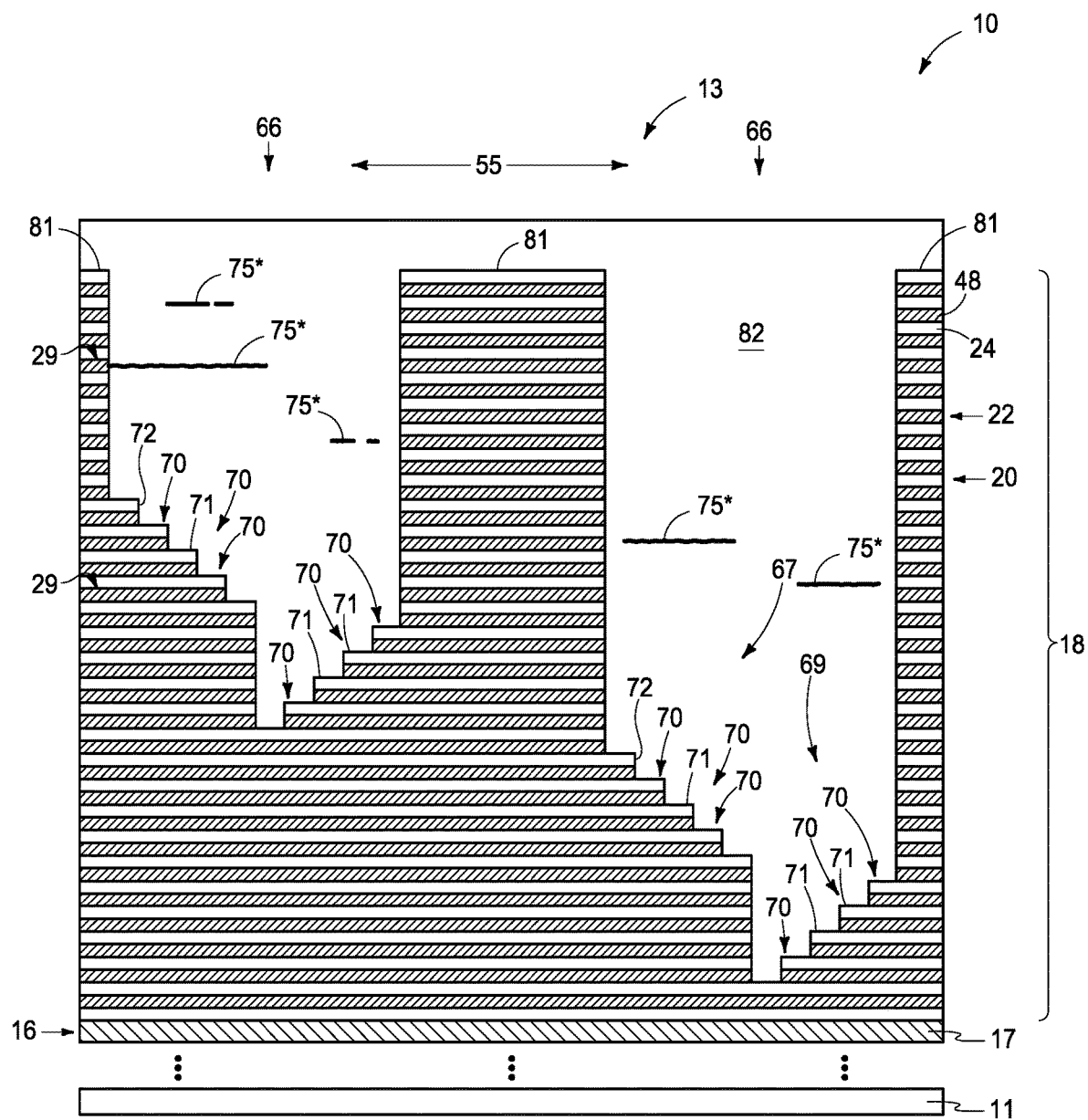
FIGS. 13-18 show example method embodiments of the invention.

Referring to FIG. 13, such shows an example predecessor construction to that shown by FIG. 7. A vertical stack (e.g., 18) has been formed and that comprises alternating insulative tiers (e.g., 20) and conductive tiers (e.g., 22) to comprise tiers of electronic components (e.g., 56) in a three-dimensional (3D) array region (e.g., 12) in a finished-circuitry construction. The insulative tiers and the conductive tiers extend from the 3D array region into a. stair-step region (e.g., 13). Individual stairs (e.g., 70) in the stair-step region comprise one of the conductive tiers [e.g., and a riser (e.g., 72)]. The vertical stack comprises insulator material (e.g., 82) in the stair-step region directly above the stairs. So-called "gate-first", so-called "gate-last", or other processing may be used. In one embodiment, a seam 75* may he formed in insulator material 82. As stated above, such may have any configuration and extent, with example a seam 75* being shown as having horizontally-elongated portions along direction 55 at different elevations (e.g., regardless of whether such might also be elongated vertically continuously or elongated vertically discontinuously).

Figure 14:
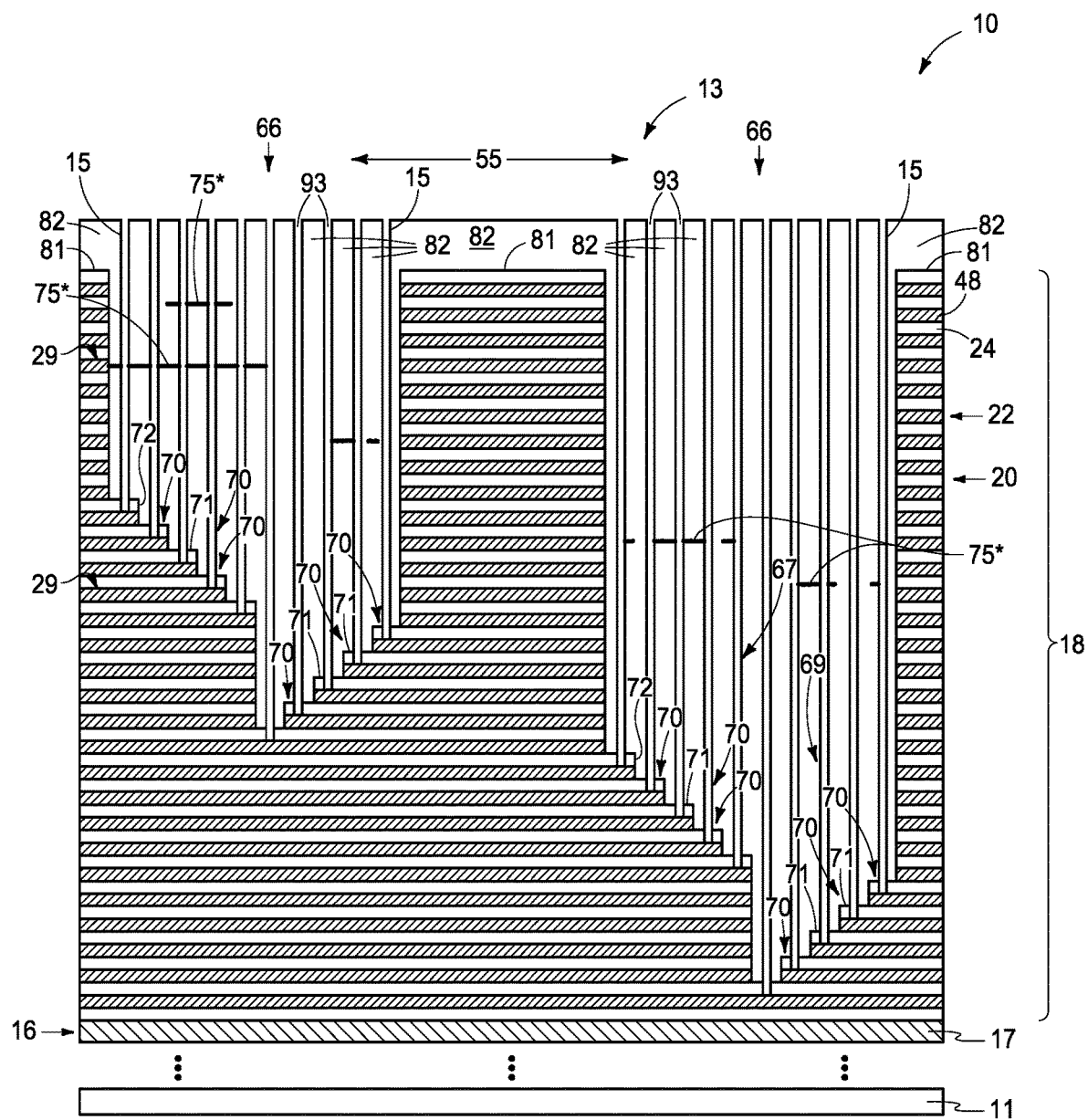
Figure 15:
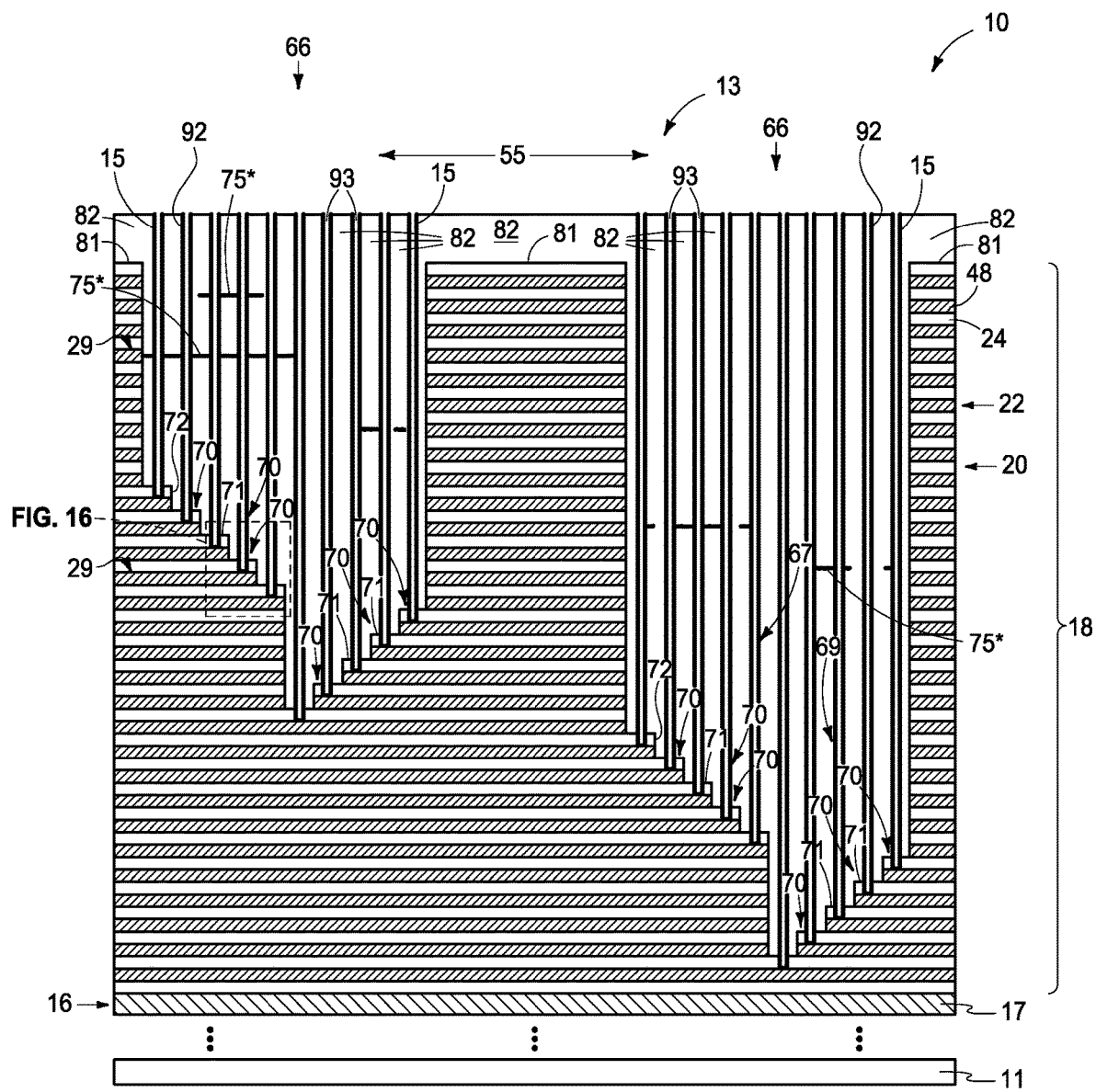
Figure 16:
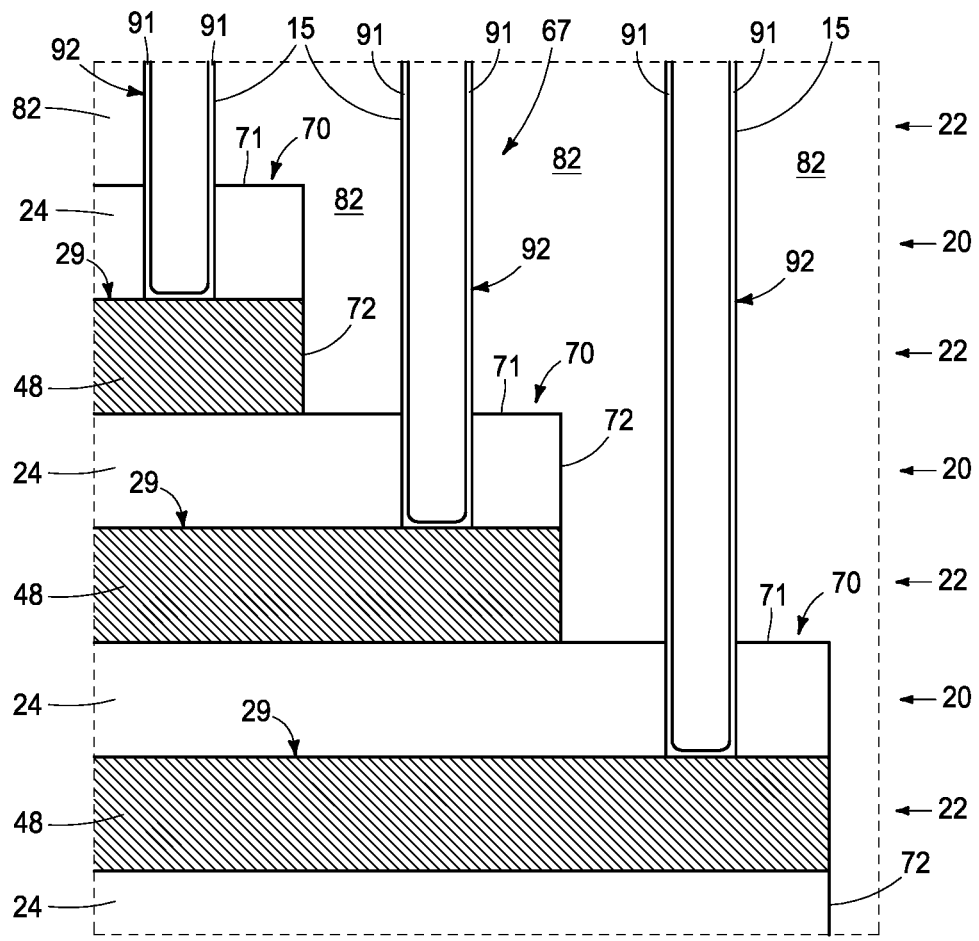
Figure 17:
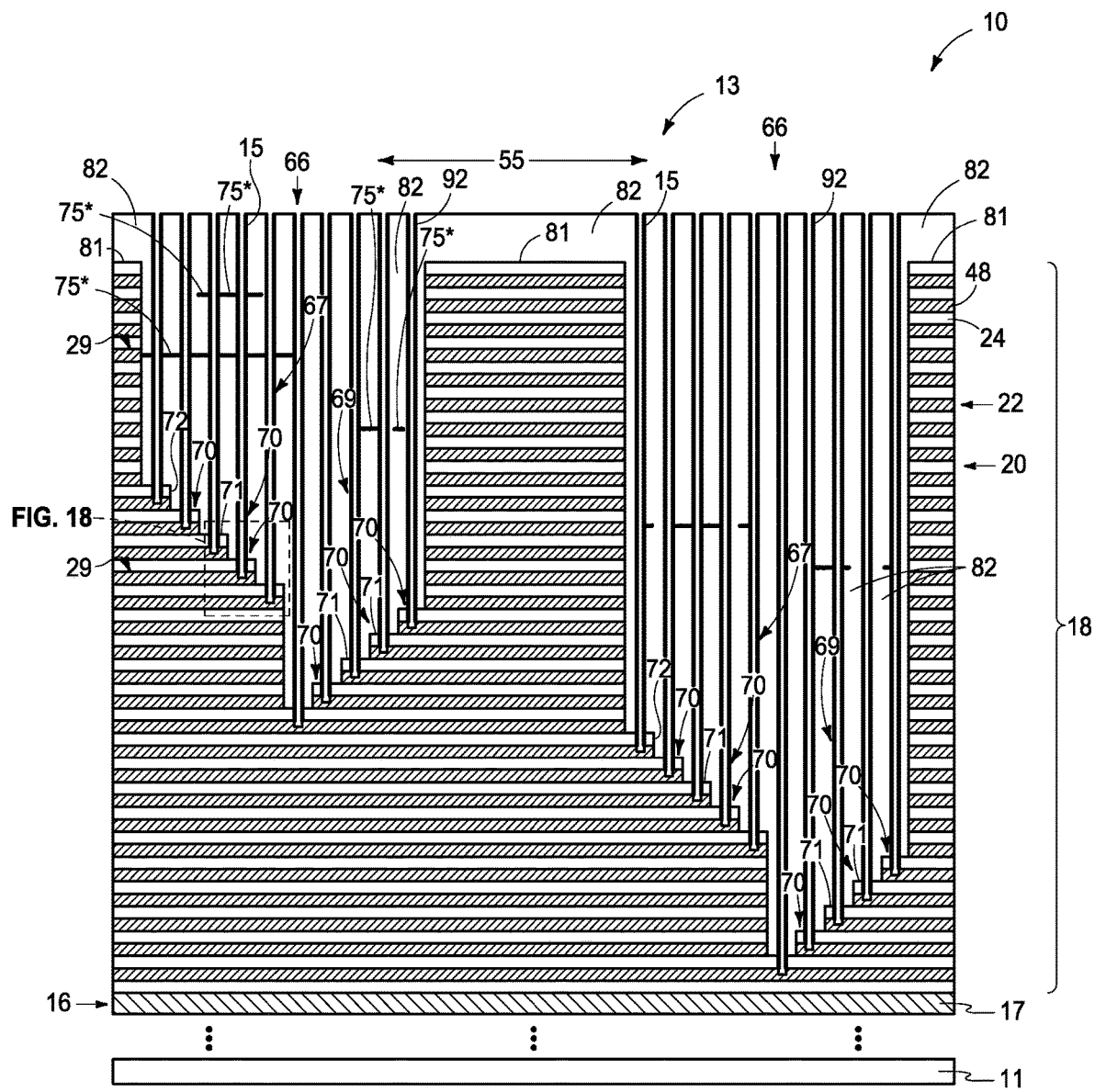
Figure 18:
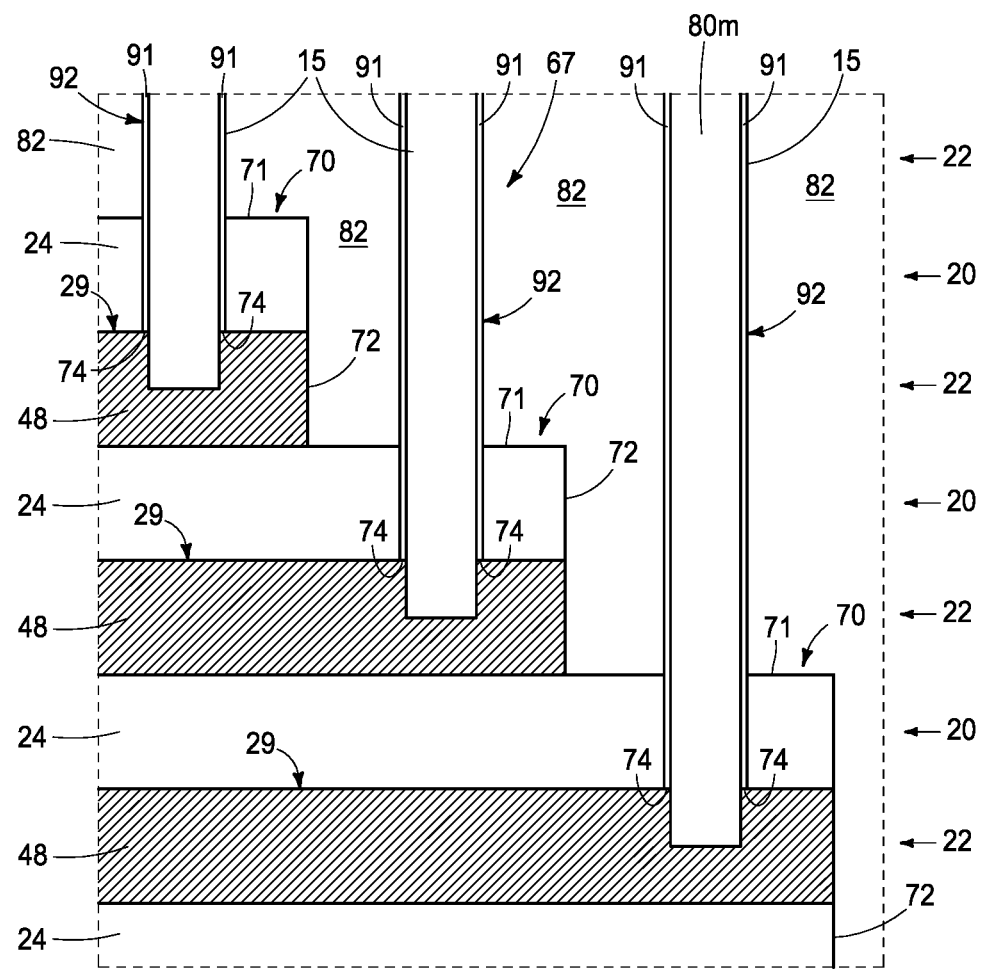

Referring to FIG. 14, contact openings (e.g., 15) have been formed (e.g., by anisotropic etching) into the insulator material and are individually directly above one of the individual stairs. Referring to FIGS. 15 and 16, and in one embodiment, the contact openings have been lined with insulative material (e.g., 91) that is over sidewalls and a bottom of individual of contact openings 15 and that less-than-fills individual contact openings 15. Referring to FIGS. 17 and 18, the insulative material has been removed from being centrally over the bottoms of the individual the contact openings (e.g., by anisotropic etching) and conducting material (e.g., 48) that is in the one conductive tier in the one individual stair that is directly below the removed insulative material has been exposed. Referring to FIGS. 7 and 9-12, conductive material (e.g., 95) has been formed in the individual contact openings radially-inward of the insulative material that lines the sidewalls of the individual contact openings to comprise conductive vias (e.g., 80*) that are individually directly against the conducting material in the one individual stair. Formation of TAVs 90 (when formed) and formation of conductive vias 80* may occur at the same time or at different times.

In one embodiment and as shown, the removing of the insulative material removes some of the conducting material in the one individual stair whereby individual of the conductive vias have a bottom that is lower than a bottom of the insulative material that is radially-outward thereof. In one such embodiment, the removing removes only some of vertical thickness of the conducting material in the one individual stair.

Any other attribute(s) or aspect(s) as shown and/or described herein with respect to other embodiments may be used.

Referring to FIG. 14, and in one embodiment, at least one of the contact openings has been formed to extend through a seam (e.g., 75*) in the insulator material, the seam being directly above and extending between treads (e.g., 71) of two immediately-adjacent of the stairs. Referring to FIGS. 15 and 16, insulative material (e.g., 91) has been formed into the seam through the at least one contact opening. Referring to FIGS. 7 and 9-12, and after forming the insulative material, conductive material (e.g., 95) has been formed in individual of the contact openings to comprise conductive vias (e.g., 80*) that are individually directly against conducting material (e.g., 48) of the one conductive tier in the one individual stair. Any other attribute(s) or aspect(s) as shown and/or described herein with respect to other embodiments may be used.

The above processing(s) construction(s) may be considered as being relative to an array of components formed as or within a single stack or single deck of such components above or as part of an underlying base substrate (albeit, the single stack/deck may have multiple tiers). Control and/or other peripheral circuitry for operating or accessing such components within an array may also be formed anywhere as part of the finished construction, and in some embodiments may be under the array (e.g., CMOS under-array). Regardless, one or more additional such stack(s)/deck(s) may be provided or fabricated above and/or below that shown in the figures or described above. Further, the array(s) of components may be the same or different relative one another in different stacks/decks and different stacks/decks may be of the same thickness or of different thicknesses relative one another. Intervening structure may be provided between immediately-vertically-adjacent stacks/decks (e.g., additional circuitry and/or dielectric layers). Also, different stacks/decks may be electrically coupled relative one another. The multiple stacks/decks may be fabricated separately and sequentially (e.g., one atop another), or two or more stacks/decks may be fabricated at essentially the same time.

The assemblies and structures discussed above may be used in integrated circuits/circuitry and may be incorporated into electronic systems. Such electronic systems may be used in, for example, memory modules, device drivers, power modules, communication modems, processor modules, and application-specific modules, and may include multilayer, multichip modules. The electronic systems may be any of a broad range of systems, such as, for example, cameras, wireless devices, displays, chip sets, set top boxes, games, lighting, vehicles, clocks, televisions, cell phones, personal computers, automobiles, industrial control systems, aircraft, etc.

In this document unless otherwise indicated, "elevational", "higher", "upper", "lower", "top", "atop", "bottom", "above", "below", "under", "beneath", "up", and "down" are generally with reference to the vertical direction. "Horizontal" refers to a general direction (i.e., within 10 degrees) along a primary substrate surface and may be relative to which the substrate is processed during fabrication, and vertical is a direction generally orthogonal thereto. Reference to "exactly horizontal" is the direction along the primary substrate surface (i.e., no degrees there-from) and may be relative to which the substrate is processed during fabrication. Further, "vertical" and "horizontal" as used herein are generally perpendicular directions relative one another and independent of orientation of the substrate in three-dimensional space. Additionally, "elevationally-extending" and "extend(ing) elevationally" refer to a direction that is angled away by at least 45° from exactly horizontal. Further, "extend(ing) elevationally", "elevationally-extending", "extend(ing) horizontally", "horizontally-extending" and the like with respect to a field effect transistor are with reference to orientation of the transistor's channel length along which current flows in operation between the source/drain regions. For bipolar junction transistors, "extend(ing) elevationally" "elevationally-extending", "extend(ing) horizontally", "horizontally-extending" and the like, are with reference to orientation of the base length along which current flows in operation between the emitter and collector. In some embodiments, any component, feature, and/or region that extends elevationally extends vertically or within 10° of vertical.

Further, "directly above", "directly below", and "directly under" require at least some lateral overlap (i.e., horizontally) of two stated regions/materials/components relative one another. Also, use of "above" not preceded by "directly" only requires that some portion of the stated region/material/component that is above the other be elevationally outward of the other (i.e., independent of whether there is any lateral overlap of the two stated regions/materials/components). Analogously, use of "below" and "under" not preceded by "directly" only requires that some portion of the stated region/material/component that is below/under the other be devotionally inward of the other (i.e., independent of whether there is any lateral overlap of the two stated regions/materials/components)

Any of the materials, regions, and structures described herein may be homogenous or non-homogenous, and regardless may be continuous or discontinuous over any material which such overlie. Where one or more example composition(s) is/are provided for any material, that material may comprise, consist essentially of, or consist of such one or more corn position(s). Further, unless otherwise stated, each material may he formed using any suitable existing or future-developed technique, with atomic layer deposition, chemical vapor deposition, physical vapor deposition, epitaxial growth, diffusion doping, and ion implanting being examples.

Additionally, "thickness" by itself (no preceding directional adjective) is defined as the mean straight-line distance through a given material or region perpendicularly from a closest surface of an immediately-adjacent material of different composition or of an immediately-adjacent region. Additionally, the various materials or regions described herein may be of substantially constant thickness or of variable thicknesses. If of variable thickness, thickness refers to average thickness unless otherwise indicated, and such material or region will have some minimum thickness and some maximum thickness due to the thickness being variable. As used herein, "different composition" only requires those portions of two stated materials or regions that may be directly against one another to be chemically and/or physically different, for example if such materials or regions are not homogenous. If the two stated materials or regions are not directly against one another, "different composition" only requires that those portions of the two stated materials or regions that are closest to one another be chemically and/or physically different if such materials or regions are not homogenous. In this document, a material, region, or structure is "directly against" another when there is at least some physical touching contact of the stated materials, regions, or structures relative one another. In contrast, "over", "on", "adjacent", "along", and "against" not preceded by "directly" encompass "directly against" as well as construction where intervening material(s), region(s), or structure(s) result(s) in no physical touching contact of the stated materials, regions, or structures relative one another.

Herein, regions-materials-components are "electrically coupled" relative one another if in normal operation electric current is capable of continuously flowing from one to the other and does so predominately by movement of subatomic positive and/or negative charges when such are sufficiently generated. Another electronic component may be between and electrically coupled to the regions-materials-components. In contrast, when regions-materials-components are referred to as being "directly electrically coupled", no intervening electronic component (e.g., no diode, transistor, resistor, transducer, switch, fuse, etc.) is between the directly electrically coupled regions-materials-components.

Any use of "row" and "column" in this document is for convenience in distinguishing one series or orientation of features from another series or orientation of features and along which components have been or may be formed. "Row" and "column" are used synonymously with respect to any series of regions, components, and/or features independent of function. Regardless, the rows may be straight and/or curved and/or parallel and/or not parallel relative one another, as may be the columns, Further, the rows and columns may intersect relative one another at 90° or at one or more other angles (i.e., other than the straight angle).

The composition of any of the conductive/conductor/conducting materials herein may be conductive metal material and/or conductively-doped semiconductive/semiconductor/semiconducting material. "Metal material" is any one or combination of an elemental metal, any mixture or alloy of two or more elemental metals, and any one or more metallic compound(s).

Herein, any use of "selective" as to etch, etching, removing, removal, depositing, forming, and/or formation is such an act of one stated material relative to another stated material(s) so acted upon at a rate of at least 2:1 by volume. Further, any use of selectively depositing, selectively growing, or selectively forming is depositing, growing, or forming one material relative to another stated material or materials at a rate of at least 2:1 by volume for at least the first 75 Angstroms of depositing, growing, or forming.

Unless otherwise indicated, use of "or" herein encompasses either and both.

Conclusion

In some embodiments, a method of forming integrated circuitry comprises forming a vertical stack comprising alternating insulative tiers and conductive tiers to comprise tiers of electronic components in a three-dimensional (3D) array region in a. finished-circuitry construction. The insulative tiers and the conductive tiers extend from the 3D array region into a stair-step region. Individual stairs in the stair-step region comprise one of the conductive tiers. The vertical stack comprises insulator material in the stair-step region directly above the stairs. Contact openings are formed into the insulator material that are individually directly above one of the individual stairs. The contact openings are lined with insulative material that is over sidewalls and a bottom of individual of the contact openings and that less-than-fills the individual contact openings. The insulative material is removed from being centrally over the bottoms of the individual the contact openings and conducting material that is in the one conductive tier in the one individual stair that is directly below the removed insulative material is exposed. Conductive material is formed in the individual contact openings radially-inward of the insulative material that lines the sidewalls of the individual contact openings to comprise conductive vias that are individually directly against the conducting material in the one individual stair.

In some embodiments, a method of forming integrated circuitry comprises forming a vertical stack comprising alternating insulative tiers and conductive tiers to comprise tiers of electronic components in a three-dimensional (3D) array region in a finished-circuitry construction. The insulative tiers and the conductive tiers extend from the 3D array region into a stair-step region. Individual stairs in the stair-step region comprise one of the conductive tiers. The vertical stack comprises insulator material in the stair-step region directly above the stairs. Contact openings are formed into the insulator material that are individually directly above one of the individual stairs. At least one of the contact openings extends through a seam in the insulator material that is directly above and extends between treads of two immediately-adjacent of the stairs. Insulative material is formed into the seam through the at least one contact opening. After forming the insulative material, conductive material is formed in individual of the contact openings to comprise conductive vias that are individually directly against conducting material of the one conductive tier in the one individual stair.

In some embodiments, memory circuitry comprising strings of memory cells comprises laterally-spaced memory blocks individually comprising a vertical stack comprising alternating insulative tiers and conductive tiers. Channel-material strings of memory cells extend through the insulative tiers and the conductive tiers in a memory-array region. The insulative tiers and the conductive tiers of the laterally-spaced memory blocks extend from the memory-array region into a stair-step region. Individual stairs in the stair-step region comprise one of the conductive tiers. Conductive vias are individually directly against conducting material that is in the one conductive tier in one of the individual stairs. Insulator material in the stair-step region is directly above the stairs. An insulative-material lining is circumferentially around and extends elevationally along individual of the conductive vias between the individual conductive vias and the insulator material. Individual of the insulative-material linings and the insulator material comprise an interface there-between.

In some embodiments, memory circuitry comprising strings of memory cells comprises laterally-spaced memory blocks individually comprising a vertical stack comprising alternating insulative tiers and conductive tiers. Channel-material strings of memory cells extend through the insulative tiers and the conductive tiers in a memory-array region. The insulative tiers and the conductive tiers of the laterally-spaced memory blocks extend from the memory-array region into a stair-step region. Individual stairs in the stair-step region comprise one of the conductive tiers. Conductive vias are individually directly against conducting material that is in the one conductive tier in one of the individual stairs. Insulator material in the stair-step region is directly above the stairs. A seam in the insulator material is directly above and extends between treads of two immediately-adjacent of the stairs. Insulative material is in the seam. Two opposing interfaces are individually between the insulative material that is in the seam and the insulator material, In some embodiments, integrated circuitry comprising a three-dimensional (3D) array region individually comprises tiers of electronic components. The 3D array region comprises a vertical stack comprising alternating insulative tiers and conductive tiers. The insulative tiers and the conductive tiers extend from the 3D array region into a stair-step region. Individual stairs in the stair-step region comprise one of the conductive tiers. Conductive vias are individually directly against conducting material that is in the one conductive tier in one of the individual stairs. Insulator material is in the stair-step region directly above the stairs. An insulative-material lining is circumferentially around and extends elevationally along individual of the conductive vias between the individual conductive vias and the insulator material. Individual of the insulative-material linings and the insulator material comprise an interface there-between.

In some embodiments, integrated circuitry comprising a three-dimensional (3D) array region individually comprises tiers of electronic components. The 3D array region comprises a vertical stack comprising alternating insulative tiers and conductive tiers. The insulative tiers and the conductive tiers extend from the 3D array region into a stair-step region. Individual stairs in the stair-step region comprise one of the conductive tiers. Conductive vias are individually directly against conducting material that is in the one conductive tier in one of the individual stairs. Insulator material is in the stair-step region directly above the stairs. A seam is in the insulator material that is directly above and extends between treads of two immediately-adjacent of the stairs. Insulative material is in the seam. Two opposing interfaces are individually between the insulative material that is in the seam and the insulator material.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

The invention claimed is:

1. A method of forming integrated circuitry, comprising:
    forming a vertical stack comprising alternating insulative tiers and conductive tiers to comprise tiers of electronic components in a three-dimensional (3D) array region in a finished-circuitry construction, the insulative tiers and the conductive tiers extending from the 3D array region into a stair-step region, individual stairs in the stair-step region comprising one of the conductive tiers, the vertical stack comprising insulator material in the stair-step region directly above the stairs;
    forming contact openings into the insulator material, the contact openings being individually directly above one of the individual stairs, at least one of the contact openings extending through a seam in the insulator material that is directly above and extends between treads of two immediately-adjacent of the stairs;
    forming an insulative material within the at least one contact opening and into the seam through the at least one contact opening, the insulative material forming a liner extending along sidewalls of the contact opening and having a bottom surface in direct physical contact with an upper surface of the conductive tier comprised by the one of the individual stairs; and
    after forming the insulative material, forming conductive material in individual of the contact openings to form conductive vias that are individually directly against conducting material of the one conductive tier in the one individual stair.

2. The method of claim 1 wherein the seam at least after forming the contact openings extends continuously between, to, and from two immediately-adjacent of the contact openings that are individually directly above a respective one of the two immediately-adjacent treads.

3. The method of claim 2 wherein the insulative material completely fills the continuously-extending seam where the seam extends continuously between, to, and from the two immediately-adjacent conductive vias.

4. The method of claim 1 wherein the seam at least after forming the contact openings does not extend continuously between, to, and from two immediately-adjacent of the contact openings that are individually directly above a respective one of the two immediately-adjacent treads.

5. The method of claim 1 wherein the seam extends horizontally-between the treads of the two immediately-adjacent stairs.

6. The method of claim 1 wherein the insulative material is directly against the insulator material.

7. The method of claim 1 wherein the insulative material and the insulator material are of different compositions relative one another.

8. The method of claim 1 wherein the insulative material and the insulator material are of the same composition relative one another.

9. The method of claim 8 wherein the insulative material is directly against the insulator material, and comprising interfaces that are individually between the insulative material and the insulator material.

10. The method of claim 1 wherein the insulative material comprises two different composition insulating materials that are directly against one another.

11. The method of claim 1 wherein the insulative material is formed to comprise an insulative lining circumferentially around and extending elevationally along individual of the conductive vias between the individual conductive vias and the insulator material.

12. The method of claim 1 wherein the conductive material in the at least one contact opening extends vertically lower than the liner of the insulative material.

* * * * *